United States Patent
Li et al.

(10) Patent No.: US 11,474,412 B2
(45) Date of Patent: Oct. 18, 2022

(54) ULTRA-WIDEBAND WHITE NOISE SOURCE

(71) Applicant: TAIYUAN UNIVERSITY OF TECHNOLOGY, Taiyuan (CN)

(72) Inventors: Pu Li, Taiyuan (CN); Yuncai Wang, Taiyuan (CN); Qiang Cai, Taiyuan (CN); Zhiwei Jia, Taiyuan (CN); Jianguo Zhang, Taiyuan (CN); Anbang Wang, Taiyuan (CN); Mingjiang Zhang, Taiyuan (CN)

(73) Assignee: TAIYUAN UNIVERSITY OF TECHNOLOGY, Taiyuan (CN)

( * ) Notice: Subject to any disclaimer, the term of this patent is extended or adjusted under 35 U.S.C. 154(b) by 0 days.

(21) Appl. No.: 17/432,425

(22) PCT Filed: Apr. 24, 2020

(86) PCT No.: PCT/CN2020/086810
§ 371 (c)(1),
(2) Date: Aug. 19, 2021

(87) PCT Pub. No.: WO2020/216346
PCT Pub. Date: Oct. 29, 2020

(65) Prior Publication Data
US 2022/0171255 A1    Jun. 2, 2022

(30) Foreign Application Priority Data
Apr. 26, 2019  (CN) .......................... 201910341890.5

(51) Int. Cl.
*G02F 1/35*       (2006.01)
*G02F 1/365*     (2006.01)
(Continued)

(52) U.S. Cl.
CPC .......... *G02F 1/3528* (2021.01); *G02F 1/3503* (2021.01); *G02F 1/365* (2013.01); *H01S 3/0092* (2013.01); *H01S 3/067* (2013.01)

(58) Field of Classification Search
CPC ...... G02F 1/3503; G02F 1/3528; G02F 1/365; H01S 3/0092; H01S 3/067
See application file for complete search history.

(56) References Cited

U.S. PATENT DOCUMENTS

2004/0212424 A1   10/2004  Allred
2019/0296512 A1*   9/2019  Wong .................... H01S 3/0085

FOREIGN PATENT DOCUMENTS

CN          2065379          11/1990
CN        103155591           6/2013
(Continued)

OTHER PUBLICATIONS

Wang et al., "Optical Heterodyne Generation of High-Dimensional and Broadband White Chaos", Journal of Selected Topics in Quantum Electronics, vol. 21, No. 6, Nov./Dec. 2015, 11 pages.
(Continued)

*Primary Examiner* — Daniel Petkovsek
(74) *Attorney, Agent, or Firm* — Hamre, Schumann, Mueller & Larson, P.C.

(57) ABSTRACT

Disclosed by the present invention is an ultra-wideband white noise source based on a slicing super-continuum spectrum. The entropy source used is a super-continuum spectrum photon entropy source having a coverage range of several hundreds of nm, white noise can thus be generated in a wide frequency range, thereby effectively avoiding the bandwidth bottleneck of an electronic device. By separately adjusting the filter centers of two optical filters, the center frequency for generating the white noise can be adjusted so as to get adapted to different working situations. High bandwidth white noise can be generated by simply filtering
(Continued)

the super-continuum spectrum and performing photoelectric conversion, and in comparison with the previous solutions, the solution of the present invention is simpler and can be easily implemented.

9 Claims, 1 Drawing Sheet

(51) Int. Cl.
*H01S 3/00* (2006.01)
*H01S 3/067* (2006.01)

(56) References Cited

FOREIGN PATENT DOCUMENTS

| | | | | |
|---|---|---|---|---|
| CN | 103368653 | | 10/2013 | |
| CN | 104516714 | | 4/2015 | |
| CN | 106932925 | | 7/2017 | |
| CN | 107203366 A | * | 9/2017 | ............... G06F 7/58 |
| CN | 107483019 | | 12/2017 | |
| CN | 110098555 | | 8/2019 | |
| CN | 110148877 | | 8/2019 | |
| CN | 110161773 | | 8/2019 | |
| CN | 110850129 | | 2/2020 | |
| CN | 110971193 | | 4/2020 | |
| GB | 2241128 | | 8/1991 | |
| JP | 2000-081898 | | 3/2000 | |
| JP | 2007-150525 | | 6/2007 | |
| WO | WO-2005086299 A1 | * | 9/2005 | ......... H01S 3/06791 |

OTHER PUBLICATIONS

Guo et al., "Real-Time and High-Speed All-Optical Quantization by Slicing Supercontinuum Spectrum", Laser & Optoelectronics Progress, vol. 55, 2018, 6 pages (English abstract included).
Li et al., "Direct generation of all-optical random numbers from optical pulse amplitude chaos", Optics Express, vol. 20, No. 4, Feb. 13, 2012, 12 pages.
International Search report, issued in the corresponding PCT application No. PCT/CN2020/086810, dated Jul. 7, 2020, 7 pages.
First Chinese Office Action issued in the corresponding Chinese patent application No. 201910341890.5, dated Jan. 28, 2021, 15 pages (machine translation included).

* cited by examiner

ULTRA-WIDEBAND WHITE NOISE SOURCE

FIELD

The present disclosure relates to the technical field of communication, in particular to an ultra-wideband white noise source based on a slicing super-continuum spectrum.

BACKGROUND

A noise source is an important instrument for device performance analysis and calibration. In communication and control systems, it is often desirable to test the anti-interference performance of electronic devices with the noise source, especially the Gaussian white noise source of uniform power density. Therefore, how to produce a Gaussian white noise signal with continuously controllable output power and uniform and flat noise power spectral density has become an important area of research.

The existing Gaussian white noise sources are generally divided into two types: the digital synthesis technology and the physical device noise amplification technology. Wherein, the digital synthesis technology utilizes a DSP or FPGA to first generate a sequence of pseudorandom numbers by an algorithm such as the linear congruential method or the shift register method, and then the sequence of pseudorandom numbers are converted into the Gaussian white noise through time domain-frequency mapping. The circuit implementing the above technology is simple and practical, but is limited to the clock frequency of the device, and the noise frequency generated by the digital synthesis technology is often lower than GHz, and the accuracy is relatively low. The physical device noise amplification technology is used to control and amplify noise in physical devices such as resistors, saturated diodes, gas discharge diodes, Schottky diodes, field effect transistors, and the like to produce the Gaussian white noise. The noise of a larger bandwidth can be produced by the technology, and the accuracy is higher, but the circuit implementing the technology often needs to be amplified and thus is relatively complicated, and with the increase of bandwidth, the output noise is worse in power flatness.

However, at present, the working frequency of the white noise source can not meet the working frequency of some high-frequency devices. How to output a continuous random noise signal with uniform and continuous power spectrum and stable and controllable power in a very wide frequency range (a bandwidth of dozens of GHz-100 GHz) has many difficulties in principle, technology and process. Therefore, it is extremely urgent to develop a new white noise source with high bandwidth, uniform spectral density, high output power and easy implementation.

SUMMARY

The objective of the present disclosure is to avoid the shortcomings of the prior art and to provide an ultra-wideband white noise source based on a slicing super-continuum spectrum.

The objective of the present disclosure can be achieved by adopting the following technical measures, an ultra-wideband white noise source based on a slicing super-continuum spectrum is designed and includes:

a fiber laser, a highly nonlinear optical fiber, a coupler I (e.g., a 3 dB coupler I), an optical filter I, an optical filter II, a coupler II (e.g., a 3 dB coupler II), and a photodetector; wherein the optical filter I and the optical filter II are arranged in parallel, the both ends connected in parallel are connected with the 3 dB coupler I and the 3 dB coupler II, respectively, the other end of the 3 dB coupler I is sequentially provided with the highly nonlinear optical fiber and the fiber laser, and the other end of the 3 dB coupler II is connected with the photodetector;

Due to the influence of the nonlinear effect in the highly nonlinear optical fiber and the modulation instability effect caused by the dispersion effect in the highly nonlinear optical fiber, the continuous laser light emitted by the fiber laser is spectrally broadened after passing through the highly nonlinear optical fiber to generate a super-continuum spectrum; the laser light after super-continuum spectrum generation is divided into two paths by the 3 dB coupler I to be filtered out by the optical filter I and the optical filter II with different center wavelengths, respectively, and the filtered laser light with different center wavelengths is then coupled together by the 3 dB coupler II to output ultra-wideband white noise through photoelectric conversion of the photodetector.

Wherein, two laser signals having different center wavelengths are convolved to produce a radio-frequency spectrum of a corresponding frequency band, the center frequencies of different frequency bands being determined by the difference in wavelength of the two laser signals.

Wherein, the nonlinear effect in the highly nonlinear optical fiber includes at least one of self-phase modulation, cross-phase modulation, four wave mixing and stimulated Raman scattering.

Wherein, the optical filter I and the optical filter II are arranged in a same filter width.

Wherein, the radio-frequency spectrum of produced white noise is equal to convolution of two optical spectra, having different center wavelengths, output after filtering from the optical filter I and the optical filter II.

Different from the prior art, the entropy source used by the ultra-wideband white noise source based on the slicing super-continuum spectrum of the present disclosure is a super-continuum spectrum photon entropy source having a coverage range of several hundreds of nm, white noise can thus be generated in a wide frequency range, thereby effectively avoiding the bandwidth bottleneck of an electronic device. By separately adjusting the filter centers of two optical filters, the center frequency for generating the white noise can be adjusted so as to get adapted to different working situations. High bandwidth white noise can be generated by simply filtering the super-continuum spectrum and performing photoelectric conversion, and in comparison with the previous solutions, the solution of the present disclosure is simpler and can be easily implemented.

DETAILED DESCRIPTION OF THE EMBODIMENTS

The technical solution of the present disclosure is further described in more detail below with reference to specific embodiments. Obviously, the described embodiments are only some, but not all, embodiments of the disclosure. Based on the embodiments in the present disclosure, all other embodiments obtained by those skilled in the art without inventive labor shall fall within the scope of protection of the present disclosure.

Figure 1:
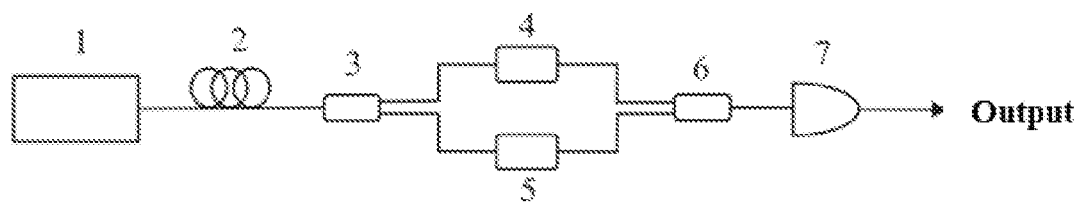
FIG. 1 is a structural schematic diagram of an ultra-wideband white noise source based on a slicing super-continuum spectrum provided by the present disclosure.

Referring to FIG. 1, FIG. 1 is a structural schematic diagram of an ultra-wideband white noise source based on a slicing super-continuum spectrum provided by the present disclosure, including:

a fiber laser 1, a highly nonlinear optical fiber 2, a 3 dB coupler I 3, an optical filter I 4, an optical filter II 5, a 3 dB coupler II 6, and a photodetector 7; wherein the optical filter I 4 and the optical filter II 5 are connected in parallel and the both ends connected in parallel are connected with the 3 dB coupler I 3 and the 3 dB coupler II 6, respectively, the other end of the 3 dB coupler I 3 is sequentially provided with the highly nonlinear optical fiber 2 and the fiber laser 1, and the other end of the 3 dB coupler II 6 is connected with the photodetector 7;

Due to the influence of the nonlinear effect in the highly nonlinear optical fiber 2 and the modulation instability effect caused by the dispersion effect in the highly nonlinear optical fiber 2, the continuous laser light emitted by the fiber laser 1 is spectrally broadened after passing through the highly nonlinear optical fiber 2 to generate a super-continuum spectrum; the laser light after super-continuum spectrum generation is divided into two paths by the 3 dB coupler I 3 to be filtered out by the optical filter I 4 and the optical filter II 5 with different center wavelengths, respectively, and the filtered laser light with different center wavelengths is then coupled together by the 3 dB coupler II 6 to output ultra-wideband white noise through photoelectric conversion of the photodetector 7.

Preferably, two laser signals having different center wavelengths are convolved to produce a radio-frequency spectrum of a corresponding frequency band, the center frequencies of different frequency bands being determined by the difference in wavelength of the two laser signals.

Preferably, the nonlinear effect in the highly nonlinear optical fiber 2 includes at least one of self-phase modulation, cross-phase modulation, four wave mixing and stimulated Raman scattering.

Preferably, the optical filter I 4 and the optical filter II 5 are arranged in a same filter width.

Preferably, the radio-frequency spectrum of produced white noise is equal to convolution of two optical spectra, having different center wavelengths, output after filtering from the optical filter I 4 and the optical filter II 5.

Figure 2:
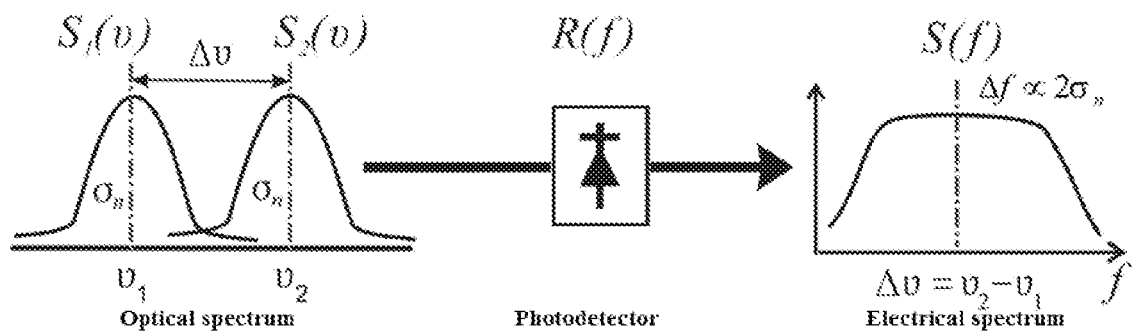
FIG. 2 is an implementation schematic diagram of an ultra-wideband white noise source based on a slicing super-continuum spectrum provided by the present disclosure.
Figure 3:
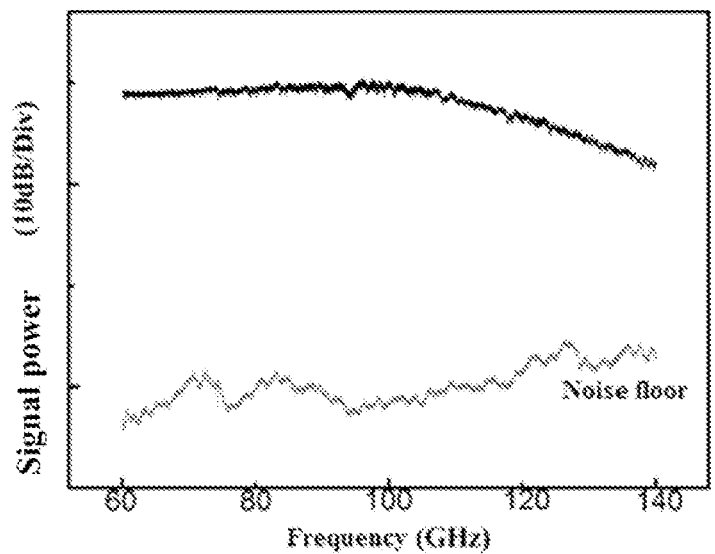
FIG. 3 is a result schematic diagram of a power spectrum of the white noise output by an ultra-wideband white noise source based on a slicing super-continuum spectrum provided by the present disclosure.

Specifically, as shown in FIG. 1, the 16 km highly nonlinear optical fiber 2 is connected behind the fiber laser 1 with a center wavelength of 1455 nm, the zero-dispersion wavelength of the highly nonlinear optical fiber 2 is about 1440 nm, and a pump of the laser 1 works in the anomalous dispersion region of the highly nonlinear optical fiber, which will lead to the modulation instability effect. Combined with the influence of nonlinear effects such as self-phase modulation, cross-phase modulation, four wave mixing and stimulated Raman scattering in the fiber, the super-continuum spectrum is finally produced. The produced super-continuum spectrum is divided into two paths by the 3 dB coupler I 3 to be filtered by two optical filters 4 and 5 with the same filter width and different filter centers. The filtered two laser signals with different center wavelengths are coupled together by the 3 dB coupler II 6, and then photoelectric conversion is carried out, and finally white noise is output. Wherein, the power spectrum of the white noise is obtained by convolution of two paths of filtered laser signals with different center wavelengths. As shown in FIG. 2, the two paths of laser signals filtered through the optical filters have the center frequencies of $v_1$ and $v_2$, respectively, and have the same line width of $\sigma_n$, and after the laser signals pass through the photodetector 7, a generated electrical spectrum has a center spectrum of $\Delta v = v_2 - v_1$, a width of $\Delta f \propto 2\sigma_n$, and a power spectral density of $S_i(f) \propto \Re \{S(v_1)*S(v_2)\}$, wherein $\Re$ the responsiveness of the photodetector. FIG. 3 is a result diagram of the finally generated white noise when the center frequency difference between two filters is 100 GHz and the filter line width is 0.6 nm.

It should be pointed out in particular that since the width of the super-continuum spectrum before filtering can reach several hundreds of nm, the center frequency of the generated electrical spectrum can be adjusted in a large range by manually adjusting the filter centers of the optical filters, so that the operating band in which the white noise is ultimately generated can be adjusted in a large range.

Different from the prior art, the entropy source used by the ultra-wideband white noise source based on the slicing super-continuum spectrum of the present disclosure is a super-continuum spectrum photon entropy source having a coverage range of several hundreds of nm, the white noise can thus be generated in a wide frequency range, thereby effectively avoiding the bandwidth bottleneck of an electronic device. By separately adjusting the filter centers of two optical filters, the center frequency for generating the white noise can be adjusted so as to get adapted to different working situations. High bandwidth white noise can be generated by simply filtering the super-continuum spectrum and performing photoelectric conversion, and in comparison with the previous solutions, the solution of the present disclosure is simpler and can be easily implemented.

The above are only the embodiments of the present disclosure, and are not thus intended to limit the patent scope of the present disclosure. Any equivalent structure or equivalent process transformation made by using the contents of the present description and drawings, or directly or indirectly applied to other related technical fields, are likewise included in the patent protection scope of the present disclosure.

What is claimed is:

1. An ultra-wideband white noise source, comprising:
   a fiber laser, a highly nonlinear optical fiber, a coupler I, an optical filter I, an optical filter II, a coupler II, and a photodetector; wherein,
   the fiber laser is connected with a first end of the coupler I through the highly nonlinear optical fiber, a second end of the coupler I is connected with a first end of the coupler II through the optical filter I and the optical filter II, the optical filter I and the optical filter II are arranged in parallel, and a second end of the coupler II is connected with the photodetector to output ultra-wideband white noise,
   wherein a continuous laser light emitted by the fiber laser is spectrally broadened after passing through the highly nonlinear optical fiber to generate a super-continuum spectrum; the laser light after super-continuum spectrum generation is divided into two paths by the coupler I to be filtered out by the optical filter I and the optical filter II with different center wavelengths, respectively, and the filtered laser lights with different center wavelengths are then coupled together by the coupler II to output ultra-wideband white noise through photoelectric conversion of the photodetector.

2. The ultra-wideband white noise source according to claim 1, wherein the coupler I is a 3 dB coupler and the coupler II is a 3 dB coupler.

3. The ultra-wideband white noise source according to claim 1, wherein two laser signals having different center wavelengths and filtered by the optical filter I and the optical filter II respectively are convolved to produce a radio-frequency spectrum of a corresponding frequency band, the center frequencies of different frequency bands being determined by the difference in wavelength of the two laser signals.

4. The ultra-wideband white noise source according to claim 1, wherein the nonlinear effect in the highly nonlinear optical fiber comprises at least one of self-phase modulation, cross-phase modulation, four wave mixing and stimulated Raman scattering.

5. The ultra-wideband white noise source according to claim 1, wherein a filter width of the optical filter I is equal to a filter width of the optical filter II.

6. The ultra-wideband white noise source according to claim 1, wherein a radio-frequency spectrum of produced white noise is equal to convolution of two optical spectra, having different center wavelengths, outputted after filtering from the optical filter I and the optical filter II.

7. The ultra-wideband white noise source according to claim 1, wherein two paths of laser signals filtered through the optical filter I and the optical filter II have the center frequencies of $v_1$ and $v_2$, respectively, and have the same line width of $\sigma_n$, and after passing through the photodetector 7, a generated electrical spectrum has a center spectrum of $\Delta v = v_2 - v_1$ and a width of $\Delta f \propto 2\sigma_n$.

8. The ultra-wideband white noise source according to claim 1, wherein the width of the super-continuum spectrum before filtering reaches a plurality of hundreds of nm.

9. The ultra-wideband white noise source according to claim 8, wherein by adjusting the filter centers of the optical filter I and the optical filter II, the center frequency of the generated electrical spectrum can be adjusted in a range, and thus the operating band in which the white noise is ultimately generated can be adjusted in a range.

* * * * *